(No Model.)

W. E. NICKERSON.
GRIP DEVICE FOR ELEVATORS, &c.

No. 397,382. Patented Feb. 5, 1889.

WITNESSES.
Frank G. Parker,
Matthew M. Blunt.

INVENTOR.
William E. Nickerson

UNITED STATES PATENT OFFICE.

WILLIAM E. NICKERSON, OF CAMBRIDGE, MASSACHUSETTS.

GRIP DEVICE FOR ELEVATORS, &c.

SPECIFICATION forming part of Letters Patent No. 397,382, dated February 5, 1889.

Application filed October 22, 1888. Serial No. 288,803. (No model.)

*To all whom it may concern:*

Be it known that I, WILLIAM E. NICKERSON, of Cambridge, in the county of Middlesex and State of Massachusetts, have invented a new and useful Improvement in Grip Devices for Elevators, &c., of which the following, taken in connection with the accompanying drawings, is a specification.

My invention relates to that class of clutch or grip devices in which a rotating friction-pawl is used to prevent motion in one direction only, the object being to make a device that is sure and noiseless in its action. This object I attain by the mechanism shown in the accompanying drawings, in which—

Figure 1:
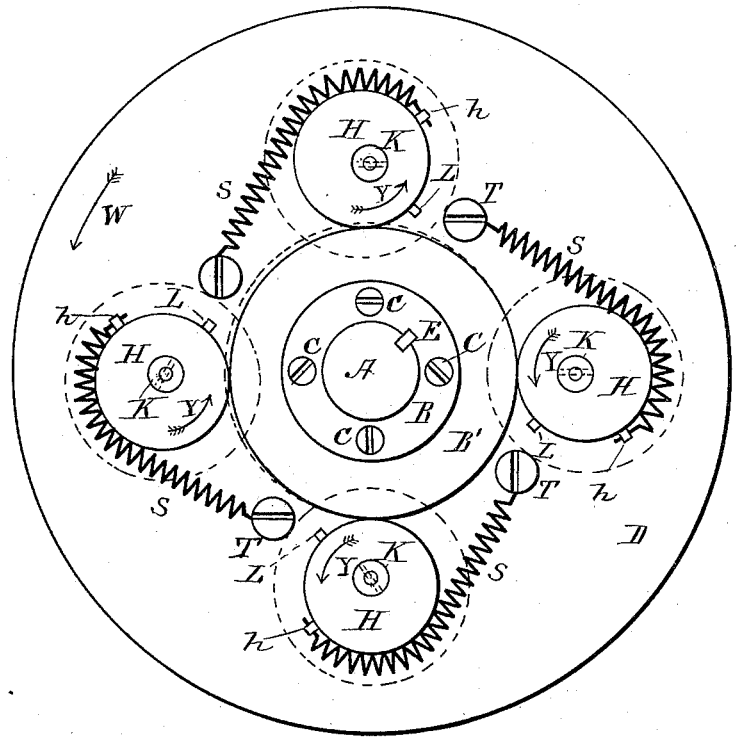
Figure 2:
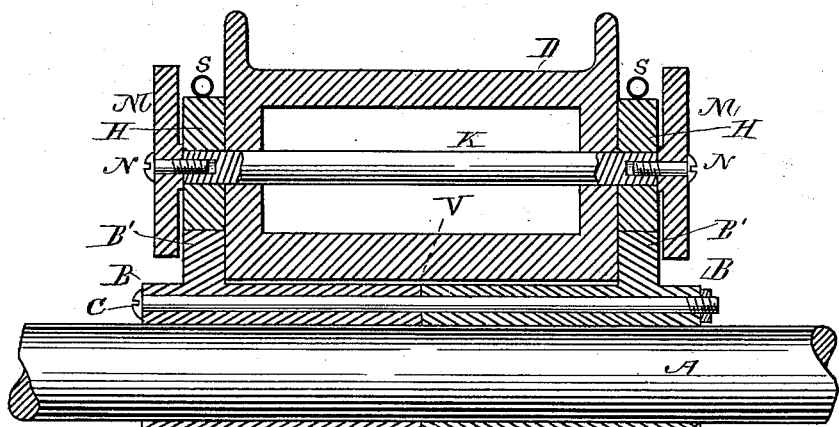

Figure 1 is a side elevation of my device as it appears in its application to the shaft of an elevator winding-arm. Fig. 2 is a longitudinal section taken through the center of a winding-drum, my friction device or grip being applied to each end.

In the drawings I have shown one form or adaptation of my friction-clutch. In this the central shaft, A, is stationary and has keyed to it by two keys—one of which is shown at E, Fig. 1—a spool or bushing, B, divided in the center at V, Fig. 2, for convenience in connecting the pulley D to the shaft A. The two parts of the spool B B are held together by the screw-bolts C C C C.

At each end of the spool B, I have cams B' B', the peripheries of which are either circular and eccentric with reference to the drum and shaft, or consist of compound curves that flow without abruptness into each other, thus constituting contours having series of superior and inferior nodes, to and from which the rotating eccentric-pawls H H traverse in the act of gripping or freeing. The cams B' B' extend beyond the ends of the drum D, as shown in Fig. 2, and are made sufficiently thick to give a broad peripheral bearing for the eccentric-pawls H H. It is not necessary to have distinct cams B' B' as bearing-surfaces, for the eccentric-pawls H H could be formed directly on the spool B, although this method would not be so good or easy to construct.

The eccentric-pawls H are mounted at each end of the main drum D upon axial shafts K, to which they are attached by means of screws or bolts N and washers or guard-disks M. Each of the eccentrics H H is kept in such a position by springs S S that it will be ready to act when needed—that is, when the drum D moves in one direction relative to the shaft A—the tendency of the springs S S being to draw the eccentric-pawls H in the direction indicated by the arrows Y Y, as shown in Fig. 1. The springs S S are connected securely at h h to the eccentric-pawls H H and at T T to the end face of the drum D. (See Fig. 1.) To prevent the friction eccentric-pawls H H from turning too far backward and thus locking the drum the way it should turn free, I place in each a check-lug, L. (See Fig. 1.)

My object in using cams B' B' for the eccentric-pawls H to operate upon, instead of circular disks turning on their centers, is that in case the disks are circular and on the centers then the eccentric-pawls H, with the exception of the comparatively-light action of the springs, have friction alone to rotate them in a locking position, while if cams B' are used, even if the eccentric-pawls H do not rotate at all, the peripheries would approach each other and thus lock.

The action of my device may be explained as follows: In turning the drum D in the direction indicated by the arrow W the eccentric-pawls H will move bodily in the direction indicated by the arrow W, but will either by the action of friction or by the springs S also rotate in the same direction, thus causing a bearing and locking action between the eccentric-pawls and the cams B' B'—in fact, preventing the rotation of the drum D in the direction of the arrow W.

In case the drum D rotates in the direction opposite to that indicated by the arrow W, then the frictional bearings of the eccentric-pawls H on the cams B' B' have a tendency to make the eccentric-pawls rotate in the opposite direction to that indicated by the arrow W and in a direction against the tendency of the springs S. In other words, the bearing-surfaces of the eccentric-pawls H and cams B' will have a tendency to separate, and thus leave the drum D free to rotate in a direction opposite to that indicated by the arrow W.

I claim—

1. In a grip device, the combination of the shaft A and bushing B, having cams B' B', with the eccentric-pawls H and drum D, all operating together substantially as described, and for the purpose set forth.

2. In a grip device, the combination of the shaft A and bushing B, having cams B' B', with the eccentric-pawls H, check-lugs L, springs S, and drum D, all operating together substantially as described, and for the purpose set forth.

In testimony whereof I have signed my name to this specification, in the presence of two subscribing witnesses, on this 20th day of October, A. D. 1888.

WILLIAM E. NICKERSON.

Witnesses:
FRANK G. PARKER,
MATTHEW M. BLUNT.